Patented Aug. 28, 1928.

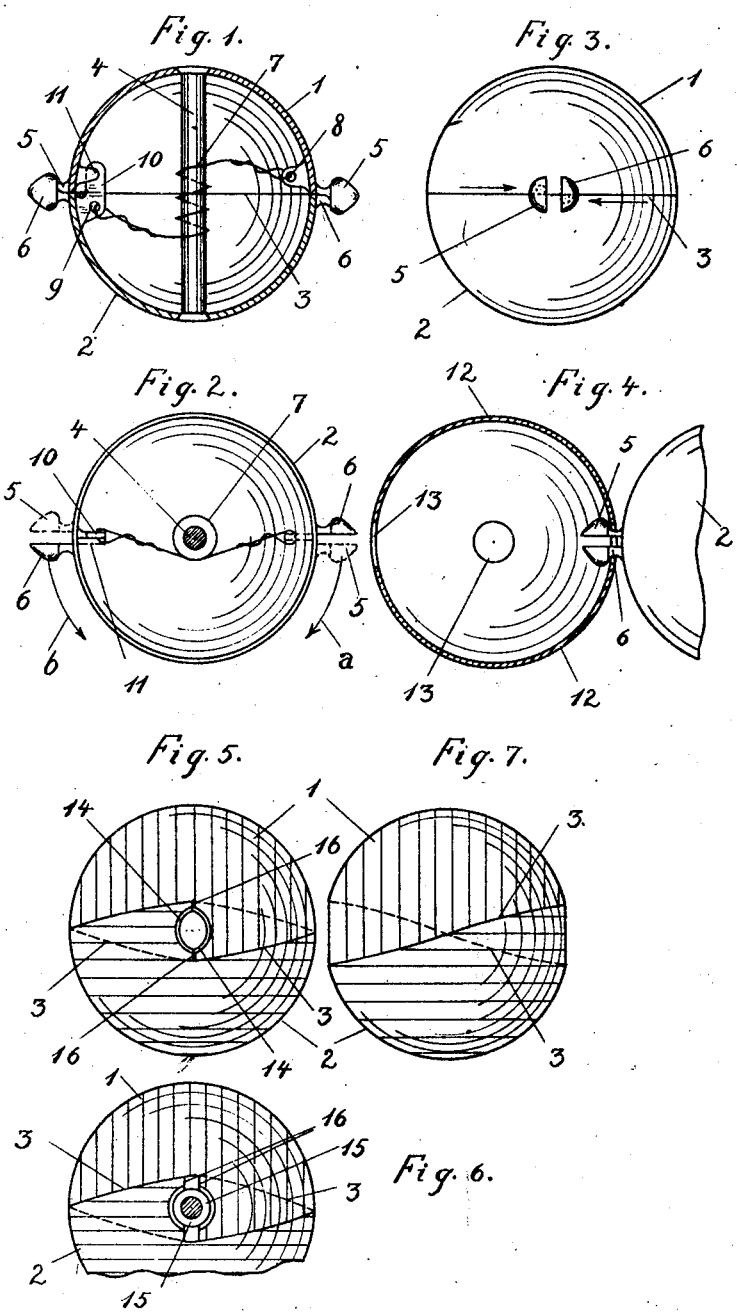

1,682,290

UNITED STATES PATENT OFFICE.

ADOLF KUHNLE, OF NEUENBURG, GERMANY.

CONNECTION DEVICE SPECIALLY FOR JEWELRY.

Application filed September 6, 1927, Serial No. 217,844, and in Germany September 13, 1926.

This invention relates to a device designed to connect bodies which serve either for ornamental or practical purposes or for both.

The novelty consists in arranging the two halves of a capsule so that they can be turned the one with regard to the other, a spring in the capsule acting upon the halves of the capsule so that either the halves or one or several knobs mounted on the capsule-halves are adjusted automatically at a predetermined distance the one from the other, or the edge-portions of the capsule-halves, which extend parallel to the pivot axle and have cut-out portions standing the one opposite the other, have the tendency to move the one towards the other so that, after insertion, the halves of the knob are held in a suitable opening, or a full knob is held in the hole formed by the cut-out portions of the edges.

Two embodiments of the invention are illustrated, by way of example, in the accompanying drawing in which:—

Fig. 1 shows in section along the pivot axis a capsule composed of two parts.

Fig. 2 is a top plan view of Fig. 1 the top half of the capsule being removed.

Fig. 3 is a side elevation of Fig. 1.

Fig. 4 shows in section a capsule made in one part and having insertion holes.

Figs. 5 to 7 show in two elevations and in side elevation a capsule composed of two parts and having cut-out portions on the edges extending parallel to the pivot axle.

The two halves 1 and 2 of the capsule are in contact along the edges 3 and they are adapted to be turned around the pivot axle 4. On opposite points of the edges 3 the halves 5, 6 of two knobs are fixed on the capsule halves 1 and 2 respectively so that the two halves 5 and 6 form at each side one complete knob. One end of a spiral spring 7, mounted on the pivot axle 4, is attached in an eye 8 of the upper half 1 of the capsule, the other end of the spring being attached in an eye 9 of the lower half 2 of the capsule. This spring 7, which is under tension, has the tendency to make the capsule halves rotate in the direction of the arrows $a$ and $b$ whereby the halves 5, 6 of each knob are moved the one away from the other. The mutual rotation of the capsule halves 1, 2 is limited by a nose 10 upwardly projecting from the lower half 2 bearing against a stop 11 in the half 1 of the capsule (see Figs. 1 and 2 the elements belonging to the top half being indicated in broken lines in Fig. 2.)

The capsule 1, 2 can be connected with any article of any shape, for instance with a spherical capsule 12 by inserting one of the knobs composed of the halves 5 and 6 into an opening 13 of capsule 12 (Fig. 4).

For the knobs composed of the halves 5 and 6 cut-out portions 14 may be substituted which are made in the edges 3 (Figs. 5 to 7), two opposite cut-out portions 14 forming together a hole designed to receive a knob 15. Portions 16 of the edges 3 are made to extend parallel to the pivot axle of the halves 1, 2 of the capsule. The spiral spring in the capsule halves causes mutual rotation of the capsule halves so that the knob 15 (Fig. 6), inserted between the cut out portions of the two halves, when said halves are being turned, is securely clamped between the cut-out portions 14.

The connecting means according to the invention can be used for many purposes, for instance for connecting a number of spherical elements, to form a string, or for connecting flat elements. The capsules may be of any shape, ornamented or not.

It is not necessary to arrange the pivot axle centrally in the capsule halves. In small-size capsules, composed of two parts, having only one hole composed of two cut-out portions and designed for instance to serve as safety device for hat pins or for scarf-pins, the pivot axle is preferably arranged distant from the insertion hole as far as possible.

I claim:—

A connecting device specially for jewelry purposes, consisting of a capsule composed of two separate halves, a pivot axle in said capsule halves, two halves of a knob fixed on the outer surface of said capsule halves one at each of two opposite points close to the edge of the capsule half, and a spiral spring in said capsule halves one end of said spring attached to one capsule half the other end attached to the other capsule half and making said capsule halves rotate around said pivot axle to move one half of each knob away from the corresponding other knob half so that said capsule halves have to be rotated in opposition to the action of said spring to bring the two halves of the knobs together to insert the whole knob into a corresponding hole of the element to be connected.

In testimony whereof I affix my signature.

ADOLF KUHNLE.